US008289988B2

(12) United States Patent
Lu et al.

(10) Patent No.: US 8,289,988 B2
(45) Date of Patent: Oct. 16, 2012

(54) WIRELESS COMMUNICATION METHODS UTILIZING A SINGLE ANTENNA WITH MULTIPLE CHANNELS AND THE DEVICES THEREOF

(75) Inventors: Hui Lu, Beijing (CN); Hong Helena Zheng, Beijing (CN); Jack Han Chin Tai, Irvine, CA (US); Gang Qiang, Shanghai (CN); Hui Yang, Beijing (CN); Shao Jie Zhang, Beijing (CN)

(73) Assignee: Skyphy Neworks Limited, Grand Cayman (KY)

( * ) Notice: Subject to any disclaimer, the term of this patent is extended or adjusted under 35 U.S.C. 154(b) by 484 days.

(21) Appl. No.: 12/567,078

(22) Filed: Sep. 25, 2009
(Under 37 CFR 1.47)

(65) Prior Publication Data

US 2010/0091712 A1 Apr. 15, 2010

Related U.S. Application Data

(60) Provisional application No. 61/194,164, filed on Sep. 25, 2008.

(51) Int. Cl.
*H04L 12/413* (2006.01)
*H04W 72/04* (2009.01)

(52) U.S. Cl. ........ 370/445; 370/328; 370/462; 370/412; 370/468; 370/252

(58) Field of Classification Search ............... 370/328, 370/338, 445, 446, 447, 461–462, 252, 329, 370/412, 468
See application file for complete search history.

(56) References Cited

U.S. PATENT DOCUMENTS

| | | | | |
|---|---|---|---|---|
| 7,359,434 B2* | 4/2008 | Shahar et al. | | 375/222 |
| 7,570,656 B2* | 8/2009 | Raphaeli et al. | | 370/445 |
| 7,693,175 B1* | 4/2010 | Benveniste | | 370/447 |
| 7,725,085 B2* | 5/2010 | Lakshmipathi | | 455/101 |
| 7,817,609 B2* | 10/2010 | Law et al. | | 370/338 |
| 7,826,473 B2* | 11/2010 | Kwon et al. | | 370/445 |
| 7,860,054 B2* | 12/2010 | Benveniste | | 370/329 |
| 7,881,277 B2* | 2/2011 | Hyon et al. | | 370/348 |
| 7,916,746 B2* | 3/2011 | Yonge et al. | | 370/445 |
| 7,940,688 B1* | 5/2011 | Benveniste | | 370/252 |

(Continued)

FOREIGN PATENT DOCUMENTS

CN 1829112 A 9/2006

(Continued)

OTHER PUBLICATIONS

A Dynamic Multi-Channel MAC for Ad Hoc LAN, Final Version submitted to 21st Biennial Symposium on Communications, Apr. 5, 2002, paper#43, Wing-Chung Hung et al.

(Continued)

*Primary Examiner* — Kwang B Yao
*Assistant Examiner* — Candal Elpenord
(74) *Attorney, Agent, or Firm* — Eastwind Consultant Co., Ltd; Jenny Chen (57) ABSTRACT

The present invention provides wireless communication methods utilizing a single antenna with multiple channels and the devices thereof. The method includes providing a plurality of communication channels within the single antenna. The plurality of communication channels may include a probe channel and a data channel. The single antenna may selectively switch between the probe channel and the data channel based on a probe signal transmitted in the probe channel so as to facilitate data transmission.

39 Claims, 4 Drawing Sheets

U.S. PATENT DOCUMENTS

| | | | |
|---|---|---|---|
| 8,040,898 B2 * | 10/2011 | Takizawa | 370/395.42 |
| 8,094,577 B2 * | 1/2012 | Kwon et al. | 370/252 |
| 8,144,604 B2 * | 3/2012 | Choi et al. | 370/248 |
| 2005/0141545 A1 * | 6/2005 | Fein et al. | 370/445 |
| 2006/0215601 A1 * | 9/2006 | Vleugels et al. | 370/328 |
| 2006/0223541 A1 * | 10/2006 | Famolari | 455/450 |
| 2009/0303888 A1 * | 12/2009 | Ariyur et al. | 370/252 |

FOREIGN PATENT DOCUMENTS

| | | |
|---|---|---|
| CN | 1918848 A | 2/2007 |
| CN | 100444543 C | 12/2008 |

OTHER PUBLICATIONS

MAC Protocols in Wireless Ad Hoc Networks: Study and Prospect, Nanjing University of Posts and Communications, Nanjing 210003, China, Zong-Ming Chen et al.

A Dynamic Multi-channel MAC Protocol Based on Load Balancing for Ad Hoc Networks, Institute of Communication and Information Engineering.

University of Electronic Science and Technology of China, Chengdu 610054, Yi Peng et al.

PCT, The International Search Report and the Written Opinion of the International Searching Authority, Jul. 2, 2009.

Computer Science, ISSN 1002-137X, vol. 32, #10, Oct. 25, 2005, pp. 44-45, 79.

Wing-Chung Hung et al. A Dynamic Multi-channel MAC for Ad Hoc LAN, Final version submitted to 21st Biennial Symposium on Communications, Apr. 5, 2002, paper #43, Apr. 5, 2002.

Telecommunication Engineering, ISSN 1001-893X, #6, Dec. 25, 2003.

* cited by examiner

WIRELESS COMMUNICATION METHODS UTILIZING A SINGLE ANTENNA WITH MULTIPLE CHANNELS AND THE DEVICES THEREOF

This application is related to and claims priority to U.S. provisional patent application, U.S. Provisional Application No. 61/194,164, filed on Sep. 25, 2008, by the applicants Hui Lu, Hong Helena Zheng, Jack Han Chin Tai, Gang Qiang, Hui Yang, and Shao Jie Zhang, entitled "Wireless communication methods utilizing a single antenna with multiple channels and the devices thereof."

FIELD OF THE INVENTION

The present invention relates to wireless communication; more particularly, the present invention relates to wireless communication methods utilizing a single antenna with multiple channels and the devices thereof.

BACKGROUND OF THE INVENTION

As the telecommunication technology evolves, wireless network communication system has become an important medium for information transmission. Some called the $20^{th}$ century an explosive generation in wireless communication. The wireless communication technology is expected to be more mature and more widely applied in the first 10 years of the $21^{st}$ century. Due to the abundance of the network resources and the development of the third generation mobile network, wireless network users have increased their demands with respect to the content of the wireless communication. As a result, the size and speed of transmission as well the quality and security of communication have become important subjects in the research and development of the current wireless communication.

Although the current wireless communication eliminates the need of wiring, the limitations imposed on bandwidth resource and transmission capability hinder the development of wireless communication. For example, the interference between communication channels, the usage of the bandwidth resources, the transmission speed, and the network size all have room for improvements.

A Chinese patent application laid open on Aug. 23, 2006 with publication number CN1822531 discloses a wireless communication system with multiple antennas. The system receives signals utilizing the baseband of the multiple antennas, and then the signals are matched for convergence. After the convergence, the signals from all antennas are then filtered. Noise signals remained in the filtered signals are then eliminated so as to calculate the transmitting signals.

However, the drawbacks of the prior art is that although the multiple antennas can increase the throughput of the network, the noise signals between the antennas are only partially eliminated, especially when the volume of data transmission is relatively large. Therefore, what is needed in the art is a wireless communication method that can eliminate the noise occurred in data transmission and the device thereof.

SUMMARY OF THE INVENTION

In light of the drawbacks of the above prior art, the present invention provides wireless communication methods utilizing a single antenna with multiple channels and the devices thereof so as to greatly enhance network throughput, noise reduction and timeliness.

One object of the present invention is to provide a wireless communication method utilizing a single antenna with multiple communication channels. The method may include providing a plurality of communication channels in a single antenna. The plurality of communication channels may include a probe channel and a data channel. The method may also include enabling the single antenna to be selectively switched between the probe channel and the data channel based on a probe signal sent from the probe channel so as to facilitate data transmission.

Another object of the present invention is to provide a method for performing loss compensation with respect to a probe signal sent from the probe channel. The method may include setting a probe signal ratio; compare the probe signal ratio with an upper limit of the probe signal ratio and a lower limit of the probe signal ratio so as to modify a probe margin value; use the probe margin value obtained to perform the loss compensation with respect to the probe signal sent from the probe channel.

Yet another object of the present invention is to provide a method for performing loss compensation with respect to data sent from the data channel. The method may include setting an upper limit for a data yield value and a lower limit for a data yield value; calculating a transmitted data count (Tx_data_cnt) and a received data count (Rx_data_cnt); compare the ratio of the received data count to the transmitted data count with the upper limit of the data yield value and the lower limit of the data yield value so as to obtain a data margin value; and performing loss compensation with respect to data sent from the data channel with the data margin value, wherein each data may be compensated with different data margin values.

Yet another object of the present invention is to provide a wireless communication device. The device may include a single antenna. The single antenna in accordance with the present invention may include a plurality of communication channels. The plurality of communication channels may include a probe channel and a data channel, wherein the single antenna may selectively switch between the probe channel and the data channel based on a probe signal sent from the probe channel so as to facilitate data transmission.

As a result, the present invention provides the following advantages: 1) noise between dual or multiple antennas during wireless communication may be avoided by utilizing a single antenna; 2) throughput of the wireless network may be enhanced through multiple data channels in the single antenna; 3) negative influence to the wireless communication caused by the environment and systems may be compensated, thereby timely adjusting the transmitting power, the transmission speed and the volume of impulse of the wireless communication device so as to improve self-adaptation of the wireless communication device to the environment it resides; 4) the present invention is relatively inexpensive, may be easily maintained and may have a long life cycle; and 5) the present invention is easy to implement and may be widely applied.

DETAILED DESCRIPTION OF THE INVENTION

In accordance with the present invention, the wireless communication methods utilizing a single antenna and the devices thereof may be implemented as illustrated in the following embodiments. However, it is understood by those skilled in the art that the embodiments described below are for illustration purpose only and are not intended to limit the scope of the present invention. Similar reference numbers refer to similar components in the accompanying drawings throughout the specification.

In accordance with the present invention, the wireless communication device may utilize a single antenna to perform a wireless communication. The single antenna of the present invention may include a plurality of communication channels. In one embodiment of the present invention, the plurality of communication channels may include a probe channel and a data channel. For example, the probe channel may be used to transmit a probe signal, such as a Request To Send (RTS) signal, a Clear To Send (CTS) signal, and/or an Acknowledge character (ACK) signal, whereas the data channel may be used to transmit a data (DATA) signal and/or an Acknowledge character (ACK) signal. In another embodiment of the present invention, the plurality of communication channels may include a probe channel and multiple data channels so as to increase the throughput of the wireless communication.

In one embodiment of the present invention, the wireless communication method utilizing a single antenna is implemented in the wireless communication device described above. The method of the present invention may include collecting information from the probe channel so as to predict the status of the data channel, utilizing the information in the probe signal, such as Request To Send (RTS) signal, Clear To Send (CTS) signal, and/or Acknowledge character (ACK) signal, to calculate the status of each communication channel, utilizing the information collected from the probe signal, such as CTS signal, to calculate the time the communication channel is to be occupied, providing an estimated time the communication channel will be occupied for those communication channels where information cannot be obtained from the probe signals, predicting the availability of the last data channel used based on the data signal sent, accepting the last channel having a successful data transmission as an available channel, determining the current status of the channel used for communication based on whether the last data packet was successfully transmitted, performing loss compensation, wherein the loss compensation with respect to the probe signal transmitted in the probe channel can be performed based on the successful rate of transmission of the probe signal, such as RTS and CTS signals, and the loss compensation with respect to the data (DATA) signal sent from the data channel can be performed based on the successful rate of transmission of the data signal so as to enhance the self-adaptability with respect to the environment the wireless communication device is in.

Figure 1A:
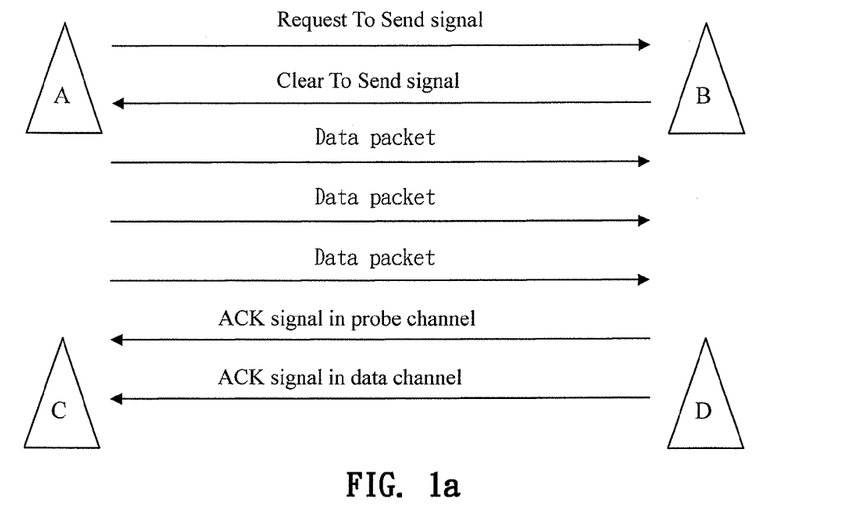
FIGS. 1a and 1b are schematic diagrams of a wireless communication in accordance with the embodiments of the present invention.
Figure 1B:
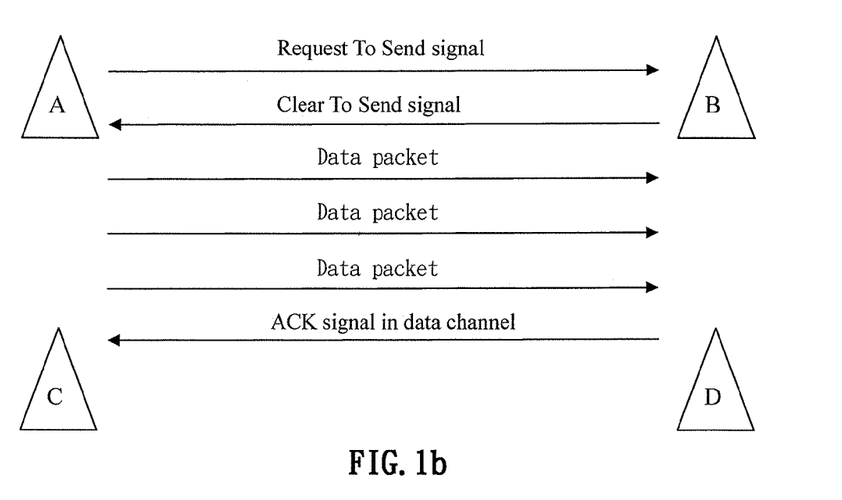
Figure 2:
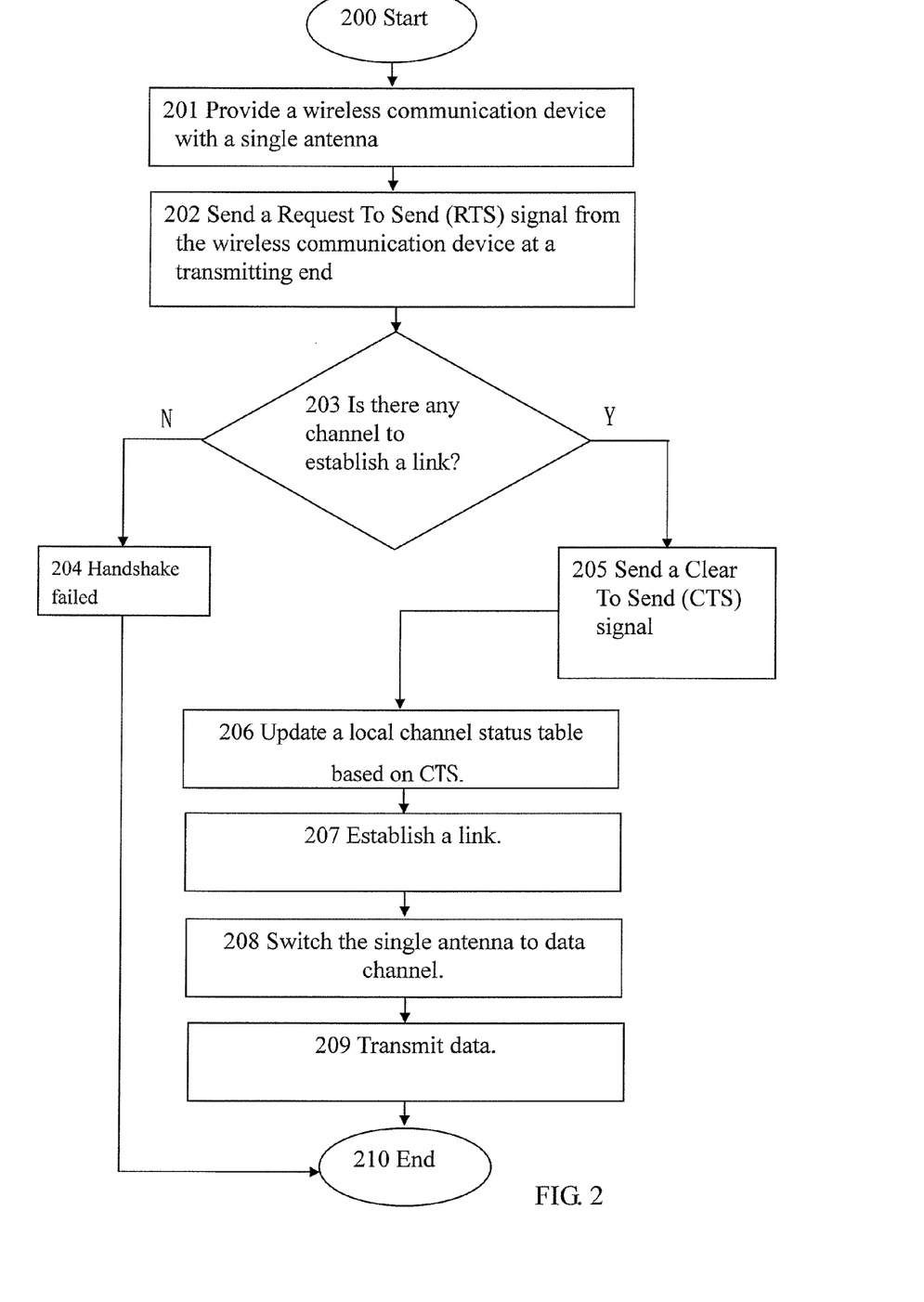
FIG. 2 illustrates a flow chart of a wireless communication method in accordance with an embodiment of the present invention.

Refer to FIGS. 1a and 1b, which illustrate the schematic diagrams of a wireless communication in accordance with the present invention. Refer to FIG. 2, which illustrates a flow chart of a wireless communication method utilizing a single antenna in one embodiment of the present invention. According to the present invention, the method may include the following steps.

As shown in FIG. 2. The method starts at step 200. In one embodiment, four wireless communication stations, such as stations A, B, C and D, may be provided to cover any given area. In the embodiment, each wireless communication station may cover the wireless communication of the wireless communication devices located within its coverage area. In step 201, each wireless communication device located within the coverage area of the respective wireless communication stations may be provided with a single antenna. As shown in FIGS. 1a and 1b, according to the present invention, the signal antenna provided within each wireless communication device may include a probe channel and a data channel. In one embodiment of the present invention, the probe channel may be used for transmitting a probe signal, such as a Request To Send (RTS) signal, a Clear To Send (CTS) signal, and/or an Acknowledge character (ACK) signal, whereas the data channel may be used for transmitting a data (DATA) signal and/or an Acknowledge character (ACK) signal. In another embodiment of the present invention, the single antenna provided in the wireless communication device may include a probe channel and multiple data channels. Signals that may be transmitted in each channel have already been described as above.

In accordance with the present invention, the single antenna of the wireless communication device may be selectively switched between the probe channel and the data channel according to the probe signal sent from the probe channel so as to facilitate data transmission. As described above, because the single antenna may include more than one data channels, the single antenna of the wireless communication device may be switched between the probe channel and the multiple data channels without affecting the performance of the wireless communication device. Additionally, the wireless communication device of the present invention may self-control its transmitting power and self-adapt to the environment it resides in.

In accordance with the present invention, each of the four wireless communication stations, namely stations A, B, C and D, may maintain a channel status table locally so as to record the status of the communication channels. In one embodiment of the present invention, the channel status table may include three parameters, such as a channel reference number, a channel status parameter, and a working time. As an example, the parameters may be indicated in the channel status table as below.

| Data channel reference number | Channel status | Time |
|---|---|---|
| 1 | | |
| 2 | | |
| 3 | | |
| 4 | | |
| 5 | | |

As an example, the channel status may be indicated as available, which is represented by 0, busy, which is represented by 1, or unknown, which is represented by 2.

In one embodiment of the present invention, one way to obtain the information in the channel status table is as follow.

By default, the channel status for all communication channels may be set as unknown, which is represented by 2. The working time in the channel status table may be set to the maximum time (maxtime) the wireless communication device may allow for the single antenna to probe the surrounding environment with the probe channel. In one embodiment of the present invention, if a probe signal, such as a CTS signal, is received within the maximum time set within the wireless communication device, then the larger value between the remaining time of the default maximum time set within the wireless communication device and the time for the channel to be occupied as indicated in the CTS signal is selected as the new maximum time.

In one embodiment of the present invention, if a probe signal, such as an ACK signal, is received within the new maximum time, then the channel status of the data channel indicated in the ACK signal is set to available, which is represented by 0.

In accordance with the present invention, when the wireless communication device located in station A wishes to transmit data to the wireless communication device located in station B, the wireless communication device located in station A may first check its channel status table. If a data channel is available, then in step 202, a probe signal, such as an RTS signal, is sent via the probe channel. In one embodiment, the RTS signal may include the channel reference number for the channel to be used for receiving the data at the wireless communication device located in station B as well as the data channel reference number for the channel currently available in the wireless communication device located at station A.

In accordance with one embodiment of the present invention, the wireless communication device located at the transmitting end, such as station A, may send the data to the wireless communication device located at the receiving end, such as station B, through Carrier Sense Multiple Access with Collision Avoidance (CSMA/CA) technique so as to prevent any collision in the data channel.

The method of the present invention may include checking the channel status table maintained at the wireless communication device located at the transmitting end, such as station A, after a short interface space (SIFS) and a random number of slot time. If an available data channel exists, then the RTS signal is sent. If, on the other hand, the channel status table maintained at the wireless communication device located at the transmitting end, such as station A, does not indicate any available channel, then an SIFS and a random number of slot time may be given. During the SIFS and the random number of slot time, if an ACK signal is received, then the channel status table may be updated. Optionally, an SIFS and a random number of slot time may be given again, so that after the SIFS and slot time expire, the RTS signal may be sent. However, if no ACK signal is received, then after the SIFS and slot time expire, an additional SIFS and a random number of slot time may be provided so as to repeat the above steps. If no ACK signal is received within a timeout period, then the channel status table may be updated so as to set the status of all data channels as available, which is represented by 0.

In one embodiment of the present invention, the method may further include the step of performing loss compensation with respect to a probe signal sent from the probe channel. After the wireless communication method located at station B receives the RTS signal transmitted from the wireless communication device located at station A, the local channel status table maintained at the wireless communication device located at station B may be checked to determine whether a channel is available for establishing a link in step 203. If no channel is available for establishing a link, then, in step 204, a handshake failure between the wireless communication devices located at stations A and B is indicated, RTS signal may be ignored, and CTS may not be sent. The wireless communication device located at station A may need to wait for a period of time set within the device before a new handshake may be established. If a channel is available to establish a link, then, in step 205, a CTS signal may be sent. In one embodiment of the present invention, the CTS signal may include the reference number of the channel sending data at station A as well as the reference number of the channel that can establish a link.

In step 206, after receiving the CTS signal sent from the wireless communication devices at station B, the wireless communication devices at stations A, C, and D may update its respective channel status table. Furthermore, the status of the channel to be occupied for transmitting data between the wireless communication devices at stations A and B are marked as busy, which is represented by 1. After the wireless communication device at station A receives the CTS signal sent from the wireless communication device at station B, the handshake therebetween becomes successful. In step 207, the wireless communication devices between stations A and B may now establish a link. Then, in step 208, the wireless communication device located at station A may switch its single antenna from the probe channel to the data channel so as to transmit data in step 209. The method ends at step 210.

In one embodiment of the present invention, the method may further fill in the time for which the channel remains busy according to a time value transmitted in the CTS signal.

In one embodiment of the present invention, the wireless communication device may further divide the data into multiple data packets. Additionally, the method of the present invention may perform loss compensation with respect to the data sent from at the wireless communication device located at station A, and then transmit the data from the wireless communication device at station A to the wireless communication device at station B.

In one embodiment of the present invention, after all data packets are transmitted, the wireless communication device at the receiving station, such as station B, may further send an ACK signal from the data channel and the probe channel, respectively. Additionally, after the wireless communication devices at wireless communication stations, such as stations A, C and D, receive the ACK signals, the wireless communication devices may update their channel status tables, respectively.

Alternatively, in another embodiment of the present invention, the wireless communication device at the receiving station, such as station B, may send an ACK signal from the data channel only. After receiving the ACK signal, the wireless communication device at the transmitting station, such as station A, may update its local channel status table. Furthermore, other wireless communication stations, such as those at stations C and D, may wait until the working time passed before updating their respective local channel status tables.

In one embodiment of the present invention, if, during data transmission, the last data packet is successfully transmitted, then the data channel used for transmitting the last data packet may be set as available, which is represented as 0. In another embodiment of the present invention, if, during data transmission, the last data packet is not successfully transmitted, then the data channel used for transmitting the last data packet may be set as unknown, which is represented as 2. If the wireless communication device located at the receiving station, such as station B, does not receive all data packets, then the wireless communication device at the transmitting station, such as station A, may re-transmit the missing data packets during the next data transmission.

According to the present invention, the wireless communication device may set a parameter for the probe channel and the data channel, respectively, so as to perform loss compensation with respect to the signals sent in the probe channel and the data channel. For example, the wireless communication device may set loss compensation values, such as a probe margin value for the probe channel and a data margin value for the data channel. In one embodiment, the probe margin value may be calculated from a probe signal ratio, such as a CTS to RTS ratio, also known as CRR. For example, the number of RTS signals transmitted and the number of CTS signals received may be counted and compared to obtain the probe signal ratio. In one embodiment, the data margin value (data_margin) may be determined from a data yield value (data_yield).

In one embodiment of the present invention, the wireless communication device may perform loss compensation with respect to the signals transmitted in each channel based on the loss compensation values, such as the probe margin value and the data margin value, calculated.

Figure 3:
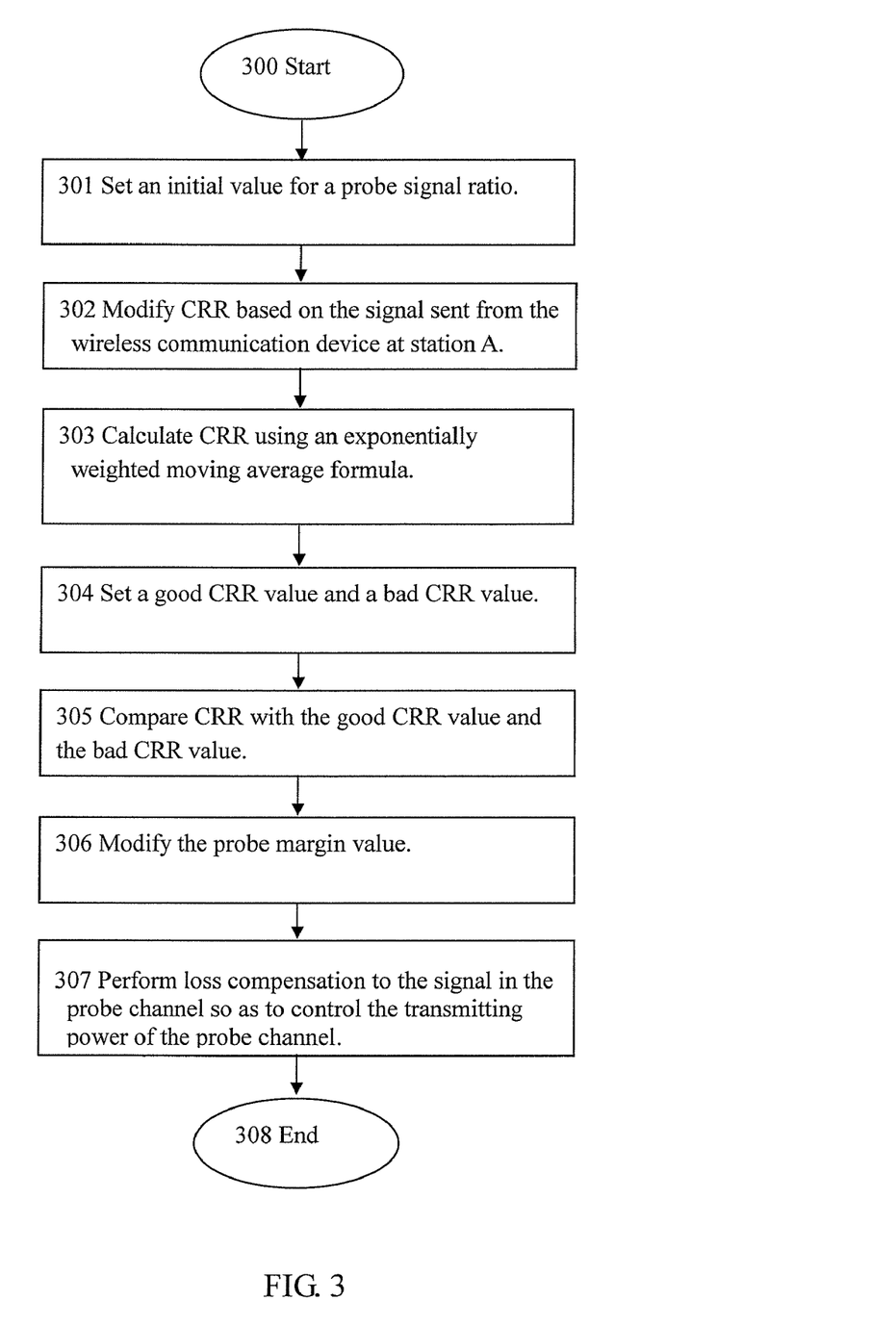
FIG. 3 illustrates a flow chart of a method for controlling a transmitting power of a probe channel of a wireless communication device in accordance with an embodiment of the present invention.

Refer to FIG. 3, which illustrates a flow chart of a method for controlling a transmitting power of the probe channel in one embodiment of the present invention. As shown in FIG. 3, in one embodiment of the present invention, the method for performing loss compensation with respect to a probe signal transmitted in the probe channel may include the following steps.

The method starts at step 300. In step 301, an initial value for the probe margin value may be set to 0.

In step 302, the probe signal ratio, such as CRR, may be modified according to the probe signals sent or received from the wireless communication device located at the transmitting end, such as station A. For example, when the wireless communication device at the transmitting station, such as station A, sends an RTS signal, the number of transmitted RTS signals is added by one, whereas when the wireless communication device at the transmitting station, such as station A, receives a CTS signal, the number of received CTS signals is added by one, thereby changing the ratio of the number of received CTS signals to that of transmitted RTS, namely the probe signal ratio (or CRR).

After the wireless communication device at the transmitting station, such as station A, sends multiple RTS signals, in step 303, the probe signal ratio, such as CRR), may be calculated using an exponentially weighted moving average formula.

According to the present invention, the exponentially weighted moving average formula may be formulated as $$CRR=CUR\_CRR*\beta+OLD\_CRR*(1-\beta).$$

Wherein CUR_CRR is the current CRR value, OLD_CRR is the last calculated CRR value, β is a configuration value set within the wireless communication device.

In step 304, 2 parameters, such as a good CRR value and a bad CRR value, are set so as to be compared with the CRR value. In step 305, the CRR is compared with the good CRR value and the bad CRR value, respectively. Thereafter, in step 306, according to a comparison result, the probe margin value is modified. For example, if the CRR value is greater than the good CRR value, then the probe margin value is decreased by one unit. If, on the other hand, the CRR value is less than the bad CRR value, then the probe margin value is increased by one unit.

In step 307, the probe margin value calculated may be used to perform loss compensation with respect to the probe signal transmitted in the probe channel, thereby controlling the transmitting power of the probe channel in accordance with the present invention. Thereafter, the method ends at step 308. Alternatively, in one embodiment, the present invention may set the CRR value back to zero so as to re-calculate the CRR value.

Figure 4:
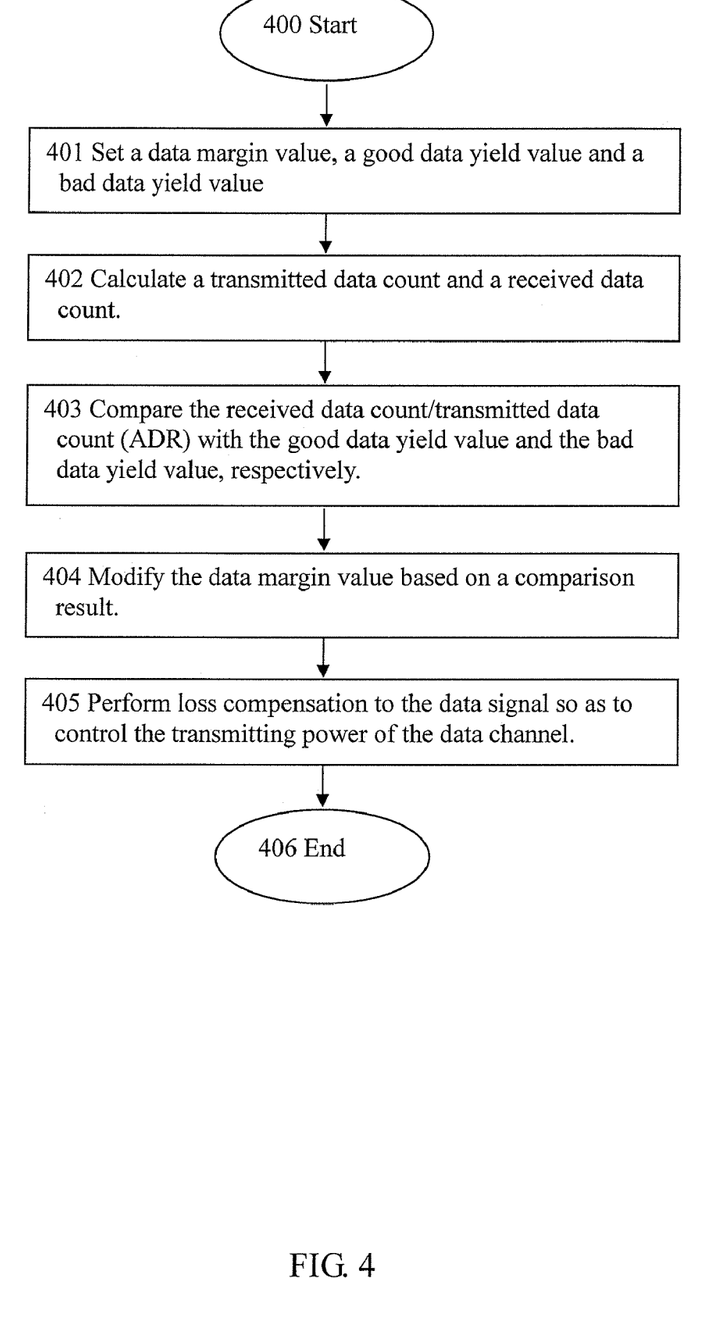
FIG. 4 illustrates a flow chart of a method for controlling a transmitting power of a data channel of a wireless communication device in accordance with an embodiment of the present invention.

Refer to FIG. 4, which illustrates a flow chart of a method for controlling a transmitting power of the data channel in accordance with the present invention. As shown in FIG. 4, in one embodiment of the present invention, the method for performing loss compensation with respect to the signal transmitted in the data channel may include the following steps.

The method starts at step 400. In step 401, three parameters, such as a data margin value, a good data yield value, and a bad data yield value, may be set. In one embodiment of the present invention, an initial value of the data margin value may be set to the current probe margin value or zero. Then, after multiple RTS signals are sent from the wireless communication device located at the transmitting station, such as station A, the method of the present invention may calculate a transmitted data count (Tx_data_cnt) and a received data count (Rx_data_cnt) in step 402.

In step 403, a ratio of the received data count (Rx_data_cnt) to the transmitted data count (Tx_data_cnt), such as (Rx_data_cnt)/(Tx_data_cnt), also known as ADR (Acknowledge character to DATA ratio), may be compared with the good data yield value and the bad data yield value, respectively.

Thereafter, in step 404, the data margin value may be modified based on a comparison result. For example, if the ratio of (Rx_data_cnt)/(Tx_data_Cnt), namely ADR, is less than the bad data yield, then the data margin value is increased by one unit. If the ratio of (Rx_data_cnt)/(Tx_data_cnt), namely ADR, is greater than the good data yield, then the data margin value is decreased by one unit.

According to the present invention, the ratio of (Rx_data_cnt)/(Tx_data_cnt), namely ADR, may be calculated using the exponentially weighted moving average formula, which may be formulated as $$ADR=CUR\_ADR*\beta+OLD\_ADR*(1-\beta).$$

Wherein CUR_ADR is the current ADR value, OLD_ADR is the last calculated ADR value, β is a configuration value set within the wireless communication device.

In step 405, the data margin value obtained may be used to perform loss compensation with respect to the signals transmitted in the data channel, thereby controlling the transmitting power of the data channel. Thereafter, the method ends at step 406. Alternatively, in one embodiment, the method may set the received data count (Rx_data_cnt) and the transmitted data count (Tx_data_cnt) back to zero so as to re-calculate the ADR value.

In one embodiment of the present invention, if the ACK signal is received, the received data count (Rx_data_cnt) may be obtained based on the information included in the ACK signal. Additionally, the received data packet count (Rx_data_cnt) may be cumulatively added so as to calculate the received data count (Rx_data_cnt) and the transmitted data count (Tx_data_cnt).

In another embodiment of the present invention, if the ACK signal is not received, then the wireless communication device at the transmitting station, such as station A, may re-transmit the RTS signal. After receiving the RTS signal, the wireless communication device at the receiving station, such as station B, may transmit the CTS signal. The last received data count (Rx_data_cnt) at the wireless communication device at the receiving station, such as station B, may be obtained by subtracting the data count needed by the wireless communication device at the receiving station, such as station B, this time, from the transmitted data count (Tx_data_cnt). The received data count (Rx_data_cnt) and the transmitted data count (Tx_data_cnt) may then be calculated by adding up the received data count (Rx_data_count). In one embodiment of the present invention, the CTS signal may contain the data needed by the wireless communication device at the receiving station, such as station B.

While the invention has been described in conjunction with exemplary preferred embodiments, it is to be understood that many alternatives, modifications, and variations will be apparent to those skilled in the art in light of the foregoing description. Accordingly, the present invention embraces all such alternatives, modifications, and variations. All matters set forth herein or shown in the accompanying drawings are to be interpreted in an illustrative and non-limiting sense.

What is claimed is:

1. A wireless communication method utilizing a single antenna, said method comprising: providing a plurality of communication channels in said single antenna, said plurality of communication channels having a probe channel and a data channel; and enabling said single antenna to selectively switch between said probe channel and said data channel based on a probe signal sent from said probe channel so as to facilitate a data transmission; and recording a channel status of each of said plurality of communication channels in a channel status table so as to facilitate said data transmission, wherein said channel status table includes a working time period, and wherein said working time period can be set as a maximum time by default, and if a Clear to Send (CTS) signal is received within said maximum time, then said maximum time is updated with a new maximum time between the working time period indicated in said CTS signal and a remaining time period of said maximum time.

2. The method of claim 1, further comprising maintaining said channel status table locally.

3. The method of claim 1, wherein said channel status table includes a channel reference number and a channel status parameter.

4. The method of claim 1, wherein said probe signal is a Request To Send (RTS) signal so as to request for said data transmission.

5. The method of claim 4, wherein said RTS signal includes a channel status of said data channel available for said data transmission.

6. The method of claim 1, wherein said probe signal is a Clear To Send (CTS) signal so as to indicate that said data channel in said plurality of communication channels can be used for establishing a link.

7. The method of claim 6, wherein said CTS signal includes a channel status of said data channel that can be used for establishing said link.

8. The method of claim 1, wherein said probe signal is an acknowledge character (ACK) signal so as to indicate a completion of said data transmission.

9. The method of claim 8, wherein said ACK signal can be sent from said data channel and said probe channel, respectively, or only from said data channel.

10. The method of claim 1, further comprising updating said channel status table.

11. The method of claim 1, wherein said channel status in said channel status table can be set to an unknown status by default.

12. The method of claim 8, if said ACK signal is received within a new maximum time, then a channel status of said data channel to be used for said data transmission is set to an available status.

13. The method of claim 1, wherein a Carrier Sense Multiple Access with Collision Avoidance (CSMA/CA) method is utilized for transmitting said data so as to avoid a collision in said data channel.

14. The method of claim 1, wherein if no channel status of said data channel in said channel status table is set to an available status, then a time period is allowed to pass until an acknowledge character (ACK) signal is received, or until said time period expires.

15. The method of claim 14, wherein said time period includes a short interface space (SIFS) and a random number of slot time.

16. The method of claim 1, further comprising checking said channel status table.

17. The method of claim 6, further comprising:
during said data transmission in said link, setting said channel status of said data channel to a busy status based on a time value within said CTS signal.

18. The method of claim 1, further comprising performing loss compensation with respect to said probe signal.

19. The method of claim 1, further comprising performing loss compensation with respect to data transmitted in said data channel.

20. A wireless communication method utilizing a single antenna, said method comprising:
providing a plurality of communication channels in said single antenna, said plurality of communication channels having a probe channel and a data channel;
enabling said single antenna to selectively switch between said probe channel and said data channel based on a probe signal sent from said probe channel so as to facilitate a data transmission;
recording a channel status of each of said plurality of communication channels in a channel status table so as to facilitate said data transmission; and
dividing said data into a plurality of data packets, and if a last data packet is successfully transmitted, then said channel status of said data channel used for transmitting said last data packet is set to an available status, and if said last data packet is not transmitted successfully, then said channel status of said data channel used for transmitting said last data packet is set to an unknown status.

21. A wireless communication device, said device comprising: a single antenna having a plurality of communication channels, said plurality of communication channels having a probe channel and a data channel, wherein said single antenna selectively switches between said probe channel and said data channel based on a probe signal sent from said probe channel, and a channel status table for recording a channel status of each of said plurality of communication channels so as to facilitate said data transmission, wherein said channel status table further includes a working time period, and wherein said working time period can be set to a maximum time by default, and if a Clear To Send (CTS) signal is received within said maximum time, then said maximum time is updated with a new maximum time between the working time period indicated in said CTS signal and a remaining time period of said maximum time.

22. The device of claim 21, wherein said single antenna of said device is capable of rapidly switching between said probe channel and a plurality of said data channels without affecting a performance of said device.

23. The device of claim 21, wherein said channel status table is maintained locally.

24. The device of claim 21, wherein said channel status table includes a channel reference number and a channel status parameter.

25. The device of claim 21, wherein said probe signal is a Request To Send (RTS) signal so as to request said data transmission.

26. The device of claim 25, wherein said RTS signal includes a channel status of said data channel available for said data transmission.

27. The device of claim 21, wherein said probe signal is a Clear To Send (CTS) signal so as to indicate said data channel available for establishing a link.

28. The device of claim 27, wherein said CTS signal includes a channel status of said data channel available for establishing said link.

29. The device of claim 21, wherein said probe signal is an acknowledge character (ACK) signal so as to indicate a completion of said data transmission.

30. The device of claim 29, wherein said ACK signal can be sent from both said data channel and said probe channel, or only from said data channel.

31. The device of claim 21, wherein said channel status table can be updated.

32. The device of claim 21, wherein said channel status in said channel status table can be set to an unknown status by default.

33. The device of claim 29, if said ACK signal is received in a new maximum time, then a channel status of said data channel for said data transmission is set to an available status.

34. The device of claim 21, wherein a Carrier Sense Multiple Access with Collision Avoidance (CSMA/CA) method is utilized for said data transmission so as to avoid a collision in mid data channel.

35. The device of claim 21, if no channel status of said data channel in said channel status table is set to an available status, then said device waits for a period of time until an ACK signal is received, or until said time period expires.

36. The device of claim 35, wherein said period of time includes a short interface space (SIPS) and a random number of slot time.

37. The device of claim 21, wherein said channel status table can be checked.

38. The device of claim 27, wherein during said data transmission in said link, said channel status is set to a busy status based on a time value obtained from said CTS signal.

39. A wireless communication device, said device comprising: a single antenna having a plurality of communication channels, said plurality of communication channels having a probe channel and a data channel, wherein said single antenna selectively switches between said probe channel, and said data channel based on a probe signal sent from said probe channel so as to facilitate a data transmission, wherein data can be divided into a plurality of data packets and if a last data packet is successfully transmitted, then said channel status of said data channel used for transmitting said last data packet is set to an available status, and if said last data packet is not successfully transmitted, then said channel status of said data channel used for transmitting said last data packet is set to an unknown status.

* * * * *